Patented Feb. 4, 1936

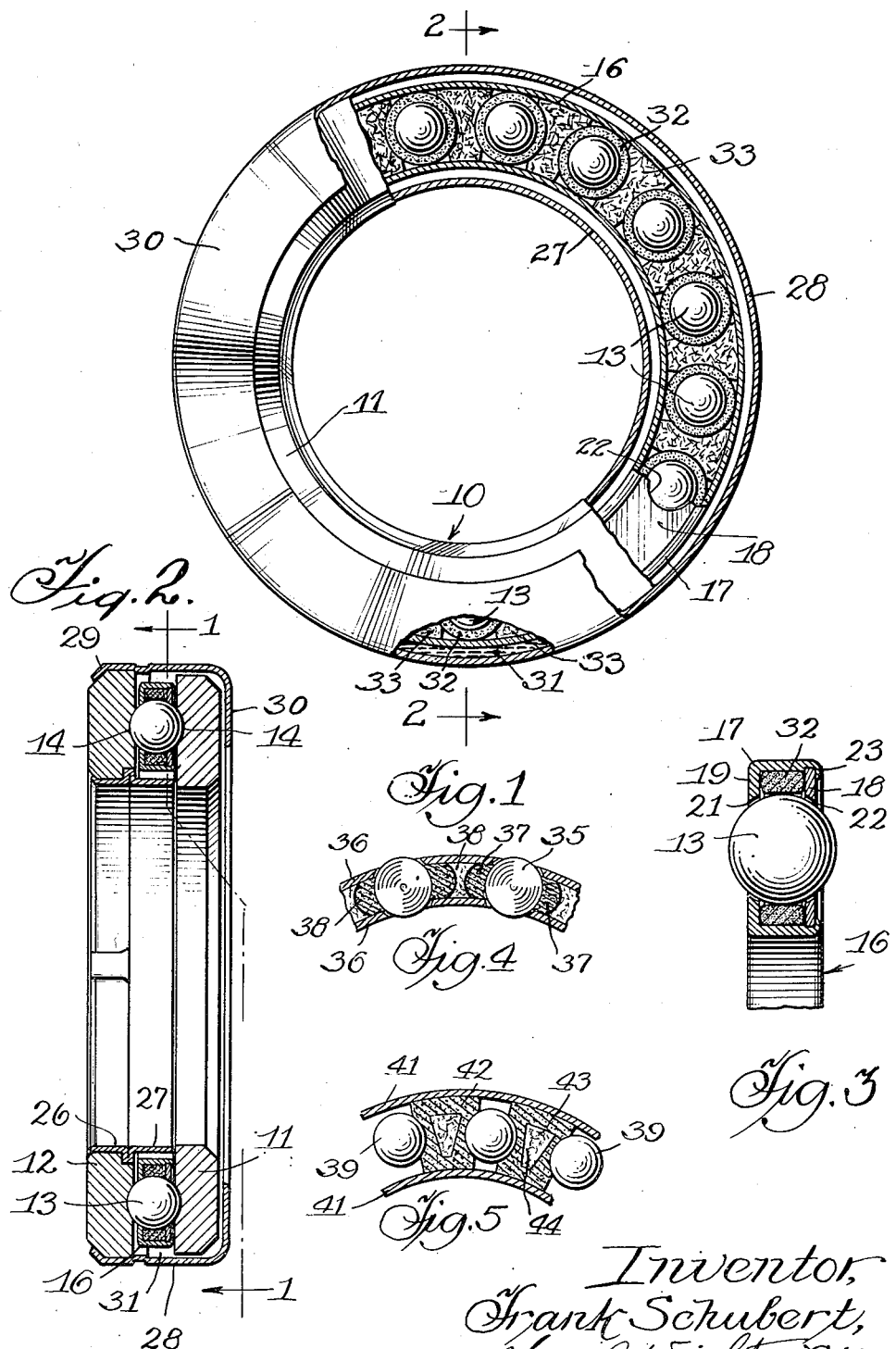

2,029,445

UNITED STATES PATENT OFFICE 2,029,445

BEARING

Frank Schubert, Detroit, Mich., assignor to Bearings Company of America, Lancaster, Pa., a corporation of Delaware Application November 22, 1934, Serial No. 754,224

8 Claims. (Cl. 308—201)

My invention relates to bearings and particularly to bearings of the anti-friction type, such as ball bearings and roller bearings, and it has for its principal object to provide improvements in the lubrication of bearings of this nature. It has been illustrated in connection with a ball thrust bearing of the kind frequently used in the construction of motor vehicles, but the invention is not limited in application to structure of this particular type, but may be employed in anti-friction bearings generally.

Bearings of the character designated are frequently installed in inaccessible locations, such that adequate lubrication from outside sources is inconvenient, if not impossible, of which a typical example is the clutch release bearing of a motor vehicle. Bearings of this nature are difficult to lubricate, and at the same time are frequently operated at speeds and under loads such as to require the most thorough and effective lubrication. It has heretofore been common practice to mount the bearing in a housing initially packed with grease or other semi-solid lubricant, but this practice has not resulted in satisfactory lubrication. Solid lubricants do not ordinarily have lubricating value comparable to liquid lubricants such as oil and have the added disadvantage that they channel and do not flow properly to the loaded areas.

To secure the recognized advantages of fluid lubricants of high lubricating value, it has also been proposed to provide bearings with oil-carrying members of absorbent material, such as felt, arranged in contact with the rolling members to feed oil directly thereto. Such arrangements secure a satisfactory lubrication of the bearing for a limited time, but are objectionable in that the balls or other rolling members remove the lubricant from the soft surfaces of the felts at a rate much higher than is needed for lubrication. The excess oil is thrown centrifugally away from the surface to be lubricated and thereby wasted, and bearings so lubricated are apt to run dry and require re-oiling of the felts at too frequent intervals.

It has also been proposed in order to prevent waste of oil by over-feeding such as described, to substitute for the soft felts a harder, porous material, from which the oil is not so rapidly removed. Such materials known to me as available for this purpose and which have a cellular structure of sufficient fineness to feed oil at the proper rate, are objectionable in that they do not have sufficient oil-carrying capacity to provide lubrication over a long period, and must be frequently re-oiled.

One of the objects of my invention is to provide a bearing with means which shall automatically distribute oil or other suitable lubricant to the load members at a rate to adequately lubricate the parts without waste, and which shall be fed by members which have sufficient oil-carrying capacity to lubricate the bearing for a long period.

Another object of the invention is to provide a device of the character designated in which any oil which may be thrown from the load members by centrifugal force during the rotation of the bearing will be retained in the bearing.

Other objects of the invention will appear from the following description, taken in connection with the drawing, which forms a part of this specification, and in which:

Fig. 1 is a view, partially in side elevation and partially in section substantially on the line 1—1 of Fig. 2, showing a ball bearing of the thrust transmitting type constructed in accordance with the invention;

Fig. 2 is a view in section, taken substantially on the line 2—2 of Fig. 1;

Fig. 3 is an enlarged detail sectional view through the ball and retainer assembly of the bearing shown in Figs. 1 and 2;

Fig. 4 is a view similar in nature to Fig. 3, showing the application of the invention to a bearing of the roller type, and Fig. 5 is a detailed sectional view illustrating a modified form of the invention.

Referring to the drawing, at 10 is shown generally an annular thrust bearing of conventional construction, comprising axially spaced race members or rings 11 and 12, between which are disposed rolling load members, such as the balls 13. The balls 13 are disposed in a circular row and are received and track in circular grooves or races 14 provided in the adjacent faces of the race rings 11 and 12. A retainer 16 is provided to hold the balls and space them circumferentially in the races, which retainer comprises an annular member 17 of channel section and a cooperating annular disk 18. The web portion 19 of the member 17 is provided with spaced holes 21 through which the balls 13 project, and the member 18 is provided with similar aligned holes 22; the holes 21 and 22 being of less diameter than the balls 13 and adapted to embrace them with small clearance when the retainer is assembled. The members 17 and 18 are held in assembled position in any convenient manner as by spinning the flanges of member 17 over the periphery of member 18, as indicated at 23.

A bronze sleeve 26 is preferably secured in the bore of the rotating ring 12 in any suitable manner, as by pressing or spinning, and is provided with a portion 27 projecting axially through the retainer 16 toward the ring 11, with which it has a small end clearance when the bearing is under load. The sleeve 26 also has a small radial clearance with the innermost flange of the member 17 and acts to support the retainer 16 and the balls, and maintain them substantially in axial alignment with the race members when the bearing is not under load and the rings 11 and 12 move apart axially.

To limit such axial separation of the rings and to retain the members of the bearing in a unit, a shell or housing 28 is provided which may be spun or otherwise suitably secured to the ring 12, as indicated at 29. The housing 28 is extended axially and is provided with a radially disposed flange 30 to embrace the ring 11 with slight clearance. Thus there is formed an annular chamber 31 between the rings 11 and 12 and the housing 28, adapted to receive and collect any oil which may be thrown off from the lubricated members during rotation of the bearing.

The lubricating means of this invention is mounted in and carried by the retainer assembly 16, and forms a part thereof. It comprises lubricant distributing members associated with each of the balls 13, together with reservoir or storage members of relatively large oil-carrying capacity adapted to feed oil to the distributing means. In the form illustrated, the distributing members consist of a collar 32 of rigid porous, oil-permeable material surrounding each of the balls 13. As best shown in Fig. 3, each of the collars 32 if of an internal diameter to make a loose rubbing fit on its associated ball, and is of a length to make a snug fit within the retainer 16, between the web 19 thereof and the member 18.

The collars 32 may be formed of any porous, non-abrasive material capable of absorbing oil, which is sufficiently hard to prevent wear by the balls, is sufficiently rigid to resist deformation under pressure, and which has a cellular structure sufficiently fine to prevent excessive withdrawal of oil by the balls. A material suitable for the purpose and preferred by me is the metallic alloy manufactured by the Amplex Manufacturing Company of Detroit, Michigan, and known as "Oilite", but it is to be understood that various kinds of porous metals and metal alloys, porous condensation products of phenol, such as the well known Bakelite, and any other material having the desired capillarity, rigidity and strength, may be used.

The spaces within the hollow retainer and between the adjacent collars 32 is packed with a suitable loose, porous, oil-retaining material having a large capacity for retaining oil and adapted to form a reservoir for supplying oil to the rings 32.

Felt inserts 33 are suitable for this purpose and since these are not in direct contact with the balls, the oil is not withdrawn from them any more rapidly than is permitted by the porosity of the collars 32. These insert members 33 are placed in position after the collars 32 have been placed on the balls 13 and the balls laid in the holes 21 of the retainer member 17. The felt inserts 33, and also the collars 32, are then saturated with oil and the member 18 is placed in position and secured in the manner indicated above. Loss of oil from the retainer 16 is negligible, since the only openings through which it may pass are the small clearances between each of the balls and the openings 21 and 22.

In Fig. 4 is illustrated an application of the invention to a thrust bearing of the roller type, in which 35 are the rollers, which roll in the well known manner between raceways not shown in the drawing. The rollers 35 are spaced circumferentially of the bearing by retainer members or rings 36, between which are carried distributing members of the rigid, oil-permeable material in the form of shoes 37, adapted to engage the rollers 35 as shown. Each of the rollers 35 is engaged by two of the shoes 37 and the space between adjacent shoes is filled with oil-storage means such as felts 38 adapted to retain a large quantity of oil and feed it to the shoes 37 as required.

Fig. 5 illustrates a modified form of the invention applied to a bearing such as shown in Figs. 1 and 2. In this arrangement the balls 39 are mounted in a retainer member 41, similar in construction to the retainer 16, which retainer 41 carries distributing members 42 of the rigid, oil-permeable material, as shown. One of the members 42 is arranged between each ball 39 and its adjacent ball, and is shaped to engage the curved surface thereof. The members 42 are provided with axially disposed recesses or openings 43 which are packed with oil-retaining means such as felt inserts 44, adapted to feed oil to the distributing members 42.

The operation of the invention will be evident from the foregoing description. The oil stored in the felt reservoir members is taken up by the capillary attraction of the porous, oil-permeable distributing members and by them fed directly to the rolling load-carrying members at a rate sufficient for the lubrication requirements of the bearing. The fine, cellular structure of the distributing members prevents a too rapid feed of the oil, and their rigidity prevents any squeezing action by reason of pressure to which they may be subjected. Thus the bearing is adequately lubricated without waste of oil, and the oil-carrying capacity of the storage members is sufficient to ensure lubrication over a substantial portion of the normal life of the bearing.

It will be understood that various forms of the invention other than those described above may be used without departing from the spirit or scope of the invention.

Having thus described the invention, what I claim and desire to secure by Letters Patent is:

1. The combination with a bearing having members arranged to roll between races and a retaining member for the rolling members, of lubricating means comprising a distributing member of hard porous material in contact with the rolling member to supply lubricant thereto, and a reservoir member carried by the retaining member adapted to supply lubricant to the distributing member.

2. The combination with a bearing having a rolling member and a retainer therefor, of a distributing member of permeable metallic material in contact with the rolling member, and means carried by the retainer to supply lubricant to said permeable member.

3. The combination with a bearing having a rolling member and a retainer therefor, of a lubricating device comprising a distributing device of rigid porous material associated with the rolling member, and absorbtive reservoir means adapted to supply lubricant to the distributing device.

4. The combination with a ball bearing having a ball retainer, of a lubricating device comprising a lubricant permeable member of stiff porous material in contact with each ball, and lubricant absorbtive means mounted on the retainer adapted to supply lubricant to the permeable member.

5. The combination with a ball bearing having a ball retainer, of a lubricating device comprising a rigid collar of porous material surrounding each ball to conduct lubricant thereto, and absorbtive storage means on the retainer to carry lubricant and supply it to said collars.

6. The combination with a ball bearing of a lubricant distributing member of rigid oil-permeable material operatively associated with each ball, and soft, absorbtive members of large oil-carrying capacity in feeding relation to the distributing members.

7. The combination with a bearing having rolling, load-carrying members, of a lubricating device comprising a rigid, porous oil-conducting member of small saturation content in distributing contact with each load-carrying member and soft, highly-absorbent members of large oil-carrying capacity in feeding relation to the conducting members.

8. The combination with a bearing having rolling, load-carrying members, of a lubricating device comprising a hard porous member of small oil-absorbing capacity in oil-distributing relation to each load-carrying member, and a soft, porous member of large oil-absorbing capacity in oil-feeding relation to said hard member.

FRANK SCHUBERT.